United States Patent [19]
Hohenstein et al.

[11] Patent Number: 5,302,907
[45] Date of Patent: Apr. 12, 1994

[54] METHOD OF AND APPARATUS FOR ASCERTAINING A CHARACTERISTIC VALUE OF A HIGH-FREQUENCY OSCILATOR

[75] Inventors: Norbert Hohenstein, Glinde; Dierk Schröder, Hamburg, both of Fed. Rep. of Germany

[73] Assignee: Korber AG, Hamburg, Fed. Rep. of Germany

[21] Appl. No.: 965,043

[22] Filed: Oct. 22, 1992

Related U.S. Application Data

[63] Continuation of Ser. No. 378,865, Jul. 12, 1989, abandoned.

[30] Foreign Application Priority Data

Jul. 23, 1988 [DE] Fed. Rep. of Germany ....... 3825111

[51] Int. Cl.⁵ .............................................. G01R 27/26
[52] U.S. Cl. ...................................... 324/655; 324/659
[58] Field of Search ............... 324/655, 659, 663, 664, 324/667, 668, 674–676, 689

[56] References Cited
U.S. PATENT DOCUMENTS

| | | | |
|---|---|---|---|
| 2,948,850 | 8/1960 | Ederer | 324/61 |
| 3,412,856 | 11/1968 | Esenwein | 209/74 |
| 3,480,857 | 11/1969 | Bialko et al. | 324/655 |
| 3,979,581 | 9/1976 | Reuland | 324/61 R X |
| 4,560,923 | 12/1985 | Hanson | 324/659 X |

Primary Examiner—Kenneth A. Wieder
Assistant Examiner—Maura K. Regan
Attorney, Agent, or Firm—Darby & Darby

[57] ABSTRACT

The resonance frequency and/or damping of a high-frequency oscillator which contains a variable impedance (such as a capacitor in a moisture detector for coffee or tobacco) is ascertained by generating first signals which denote the envelope curves of oscillations during intervals between successive excitations of the oscillator. Pairs of second signals denoting predetermined portions of envelope curves are transmitted to a dividing circuit, and the quotients of such pairs of second signals are indicative of the damping. Resonance frequency is ascertained by counting the number of oscillations per interval. Oscillations of the oscillator can be rectified prior to the generation of first signals.

11 Claims, 1 Drawing Sheet

5,302,907

METHOD OF AND APPARATUS FOR ASCERTAINING A CHARACTERISTIC VALUE OF A HIGH-FREQUENCY OSCILLATOR

This application is a continuation of application Ser. No. 07/378,865, filed Jul. 12, 1989, now abandoned.

BACKGROUND OF THE INVENTION

The invention relates to a method of ascertaining variable characteristic values of high-frequency oscillators. The invention also relates to an apparatus for ascertaining such characteristic values (particularly the damping and/or the resonance frequency) of high-frequency self-oscillating (free-running) oscillators.

Oscillators which embody or are combined with measuring impedances (such as capacitors and/or inductance coils) are used extensively in many fields, for example, in the field of measuring the moisture content of coffee, tobacco, paper and the like. It is also known to vary the damping (and possibly also the resonance frequency) by influencing the impedances so that a determination of changes of damping and/or resonance frequency can result in a determination of changes of moisture content or other parameters of commodities which influence the impedance of the oscillator. Reference may be had, for example, to U.S. Pat. Nos. 2,948,850 and 3,979,581 which disclose high-frequency oscillators with measuring capacitors and wherein the capacitors are influenced by one or more commodities, such as tobacco, coffee, paper, fabric, plastics and/or others, particularly for determination of the moisture content of such commodities. A continuous electric signal is generated as the commodities advance past the capacitor, and such signal is indicative of damping of the capacitor. This signal, together with a signal which corresponds to resonance frequency of the oscillator, can be used for the generation of a signal denoting the moisture content of conveyed commodities. Reference may also be had to U.S. Pat. No. 3,412,856.

OBJECTS OF THE INVENTION

An object of the invention is to provide a novel and improved method of rapidly, continuously and accurately determining the resonance frequency and/or damping of a high-frequency oscillator.

Another object of the invention is to provide a novel and improved method of measuring the moisture content of coffee, paper, tobacco, fabrics and/or other commodities.

A further object of the invention is to provide a novel and improved apparatus for the practice of the above outlined method.

An additional object of the invention is to provide the apparatus with novel and improved means for processing signals corresponding to oscillations of a high-frequency self-oscillating (free running) harmonic oscillator which contains a variable impedance.

Still another object of the invention is to provide the apparatus with novel and improved means for generating signals which are indicative of damping of the oscillator.

A further object of the invention is to provide the apparatus with novel and improved means for generating signals denoting the resonance frequency of the oscillator.

SUMMARY OF THE INVENTION

One feature of the present invention resides in the provision of a method of ascertaining a characteristic value (such as the damping or the resonance frequency) of a self-oscillating harmonic high-frequency oscillator which oscillates during intervals between periodically occurring excitations and contains an impedance, such as the measuring capacitor of a moisture detector. For the purpose of ascertaining the damping of the oscillator, the method comprises the steps of exciting the oscillator including periodically applying electrical pulses thereto (e.g., by means of a pulse generator through the medium of a synchronizing circuit), generating (for example, in a low-pass filter) first signals which denote the envelope curves of oscillations during intervals of oscillation between successive excitations of the oscillator, sampling each first signal (e.g., with a track/sample-hold amplifier) and generating at least two second signals corresponding to the values of each sampled first signal during predetermined times or stages of the respective interval, and generating third signals which denote the damping and constitute quotients of the second signals for each first signal.

The method can further comprise the step of rectifying the oscillations (e.g., in a double-balanced mixer). The step of generating first signals then includes generating signals which denote the envelope curves of rectified oscillations.

The method can further comprise the steps of generating square pulses having a frequency corresponding to that of oscillations during successive intervals, and rectifying the oscillations in the mixer during each interval with the corresponding square pulses. The step of generating first signals then includes generating signals which denote the envelope curves of rectified oscillations at the output of the mixer during the intervals of excitation of the oscillator.

The sampling step is preferably carried out by a sample-hold amplifier when the square pulses reach predetermined times during the respective intervals.

The electrical pulses are or can be synchronized with the square pulses.

For the purpose of ascertaining the oscillation frequency, the method further comprises counting the number of oscillations during an interval, particularly counting the number of square pulses during the intervals.

Another feature of the invention resides in the provision of an apparatus for ascertaining a characteristic value, such as damping or resonance frequency, or a self-oscillating high-frequency oscillator which oscillates during intervals between periodically occurring excitations and contains an impedance, such as the measuring capacitor of a moisture detector. The apparatus comprises means for periodically applying relatively short excitation pulses to the input of the oscillator so that the latter oscillates during intervals between the application of successive pulses, first signal generating means (e.g., a combination of a double-balanced mixer and a low-pass filter) which is operative to generate first signals denoting the envelope curves of oscillations during intervals of oscillation between successive excitations of the oscillator, second signal generating means (for example, signal generator means including a track/sample-hold amplifier) including sampling means which is operable to sample each first signal and to generate second signals denoting the values of sampled first signal during predetermined times or stages of the respective interval, and means (e.g., a dividing circuit) for generating third signals which are indicative of damping of the oscillator. The means for generating third signals includes means for forming quotients of second signals for each first signal.

The apparatus preferably further comprises comparator means which is connected with the output of the oscillator and includes means for generating square pulses having a frequency corresponding to that of oscillations during the intervals of oscillation of the oscillator.

The first signal generating means preferably includes means (such as the aforementioned double-balanced mixer) for rectifying the oscillations of the oscillator, and the aforementioned low-pass filter for rectified oscillations. A first input of the double-balanced mixer is connected with the output of the oscillator (e.g., by way of an amplifier), and the output of the comparator means is connected with a second input of the mixer so that the latter can rectify the oscillations with the square pulses.

The comparator means operates the sampling means of the second signal generating means when the sums of square pulses during the aforementioned intervals reach predetermined numbers of pulses.

The excitation pulses for the oscillator can be synchronized with square pulses which are transmitted by the comparator means to a synchronizing circuit for the pulse applying means.

The resonance frequency of the oscillator can be ascertained with a counter which counts the oscillations or square pulses during the intervals of excitation of the oscillator.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
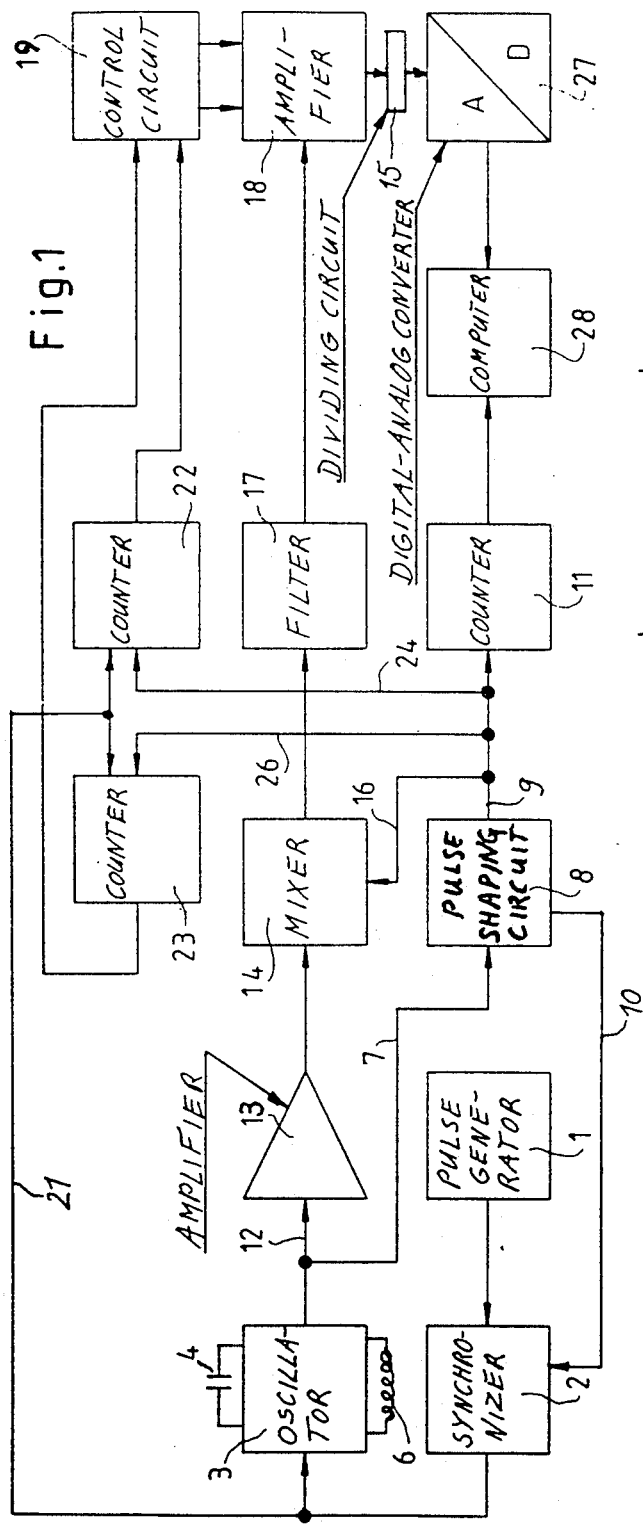
FIG. 1 is a circuit diagram of an apparatus which embodies one form of the invention and is designed to ascertain the damping and the resonance frequency of a high-frequency oscillator.

FIG. 1 shows a pulse generator 1 which serves to transmit high-frequency excitation pulses to a self-oscillating harmonic high-frequency measuring oscillator 3. The transmission of pulses to the oscillator 3 takes place by way of a synchronizing circuit 2 at a frequency of, for example, approximately 250 KHZ. The oscillator 3 comprises a measuring capacitor 4 which contains, or is continuously traversed by, the commodity to be monitored, for example, a commodity having a variable moisture content. The plates of the capacitor 4 can flank a portion of the path for a stream of tobacco particles, for a stream of coffee beans or comminuted coffee beans or any other product having a variable moisture content which requires continuous or sporadic determination. The illustrated oscillator 3 further comprises an inductance 6, e.g., in the form of a coil. This oscillator oscillates spontaneously in response to transmission of excitation pulses from the pulse generator 1 by way of the synchronizing circuit 2, and the frequency of such oscillations corresponds to resonance frequency of the oscillator. The oscillations decay at a rate which corresponds to damping of the oscillator 3 and is a function of the moisture content and mass of tested material.

Figure 2:
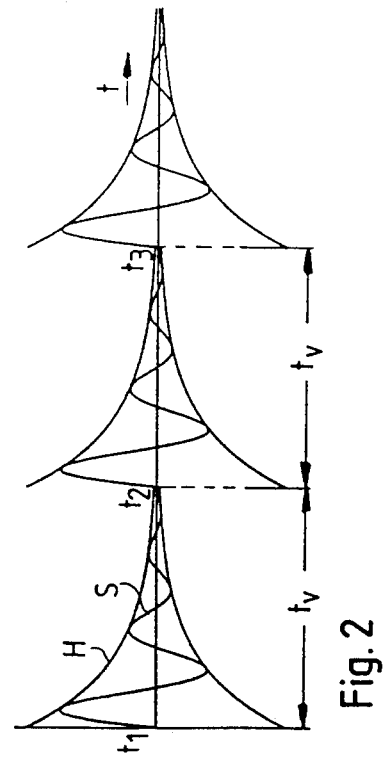
FIG. 2 is a diagram showing the envelope curves of oscillations between successive excitations of the oscillator.

In the diagram of FIG. 2, time t is measured along the abscissa and the amplitude of oscillations S of the oscillator 3 is measured along the ordinate. The reference character H denotes the envelope curve of oscillations S within successive intervals $t_v$ of time. The characters $t_1$, $t_2$, $t_3$ denote the instants of excitation of the oscillator 3. The envelope curves H are indicative of damping of the oscillator 3 and hence of the rate of decay of the oscillations S.

It will be appreciated that the number of oscillations S per interval $t_v$ is much larger than shown (merely by way of example) in FIG. 2.

The output of the oscillator 3 is connected to the corresponding input of a pulse generating circuit 8 via conductor 7. The circuit 8 which may include a comparator) can constitute a regenerative operational amplifier which converts spontaneous oscillations of the self-oscillating oscillator 3 into a series of square pulses of identical frequency but constant amplitude. Such square pulses are transmitted, via conductor 9, to the input of a counter 11 wherein they are counted, preferably within the same intervals. Signals denoting the count of the counter 11, or equivalent digital signals, are indicative of resonance frequency of the oscillator 3.

The output of the pulse generator 8 is further connected, via conductor 10, with the corresponding input of the synchronizing circuit 2. The latter synchronizes electric excitation pulses from the pulse generator 1 with oscillations of the self-oscillating oscillator 3. This renders it possible to measure the frequency beyond an interval $t_v$ and to thus increase the accuracy of measurement.

The output of the oscillator 3 is further connected, via conductor 12, to the input of an amplifier 13 having an output connected with one input of a circuit 14 known as double-balanced mixer (also called ring modulator). A suitable mixer is described, by way of example, on pages 138-143 of "Elektronische Bauelemente und Netzwerke II" by H. G. Unger and W. Schultz (published by Vieweg-Verlag, Federal Republic of Germany). Mixers which are especially suitable for use in the apparatus of FIG. 1 are known as Model No. SRA-6 and are distributed by Industrial Electronics GmbH, Klüberstrasse 14, D-6000 Frankfurt/Main, Federal Republic of Germany.

Figure 3:
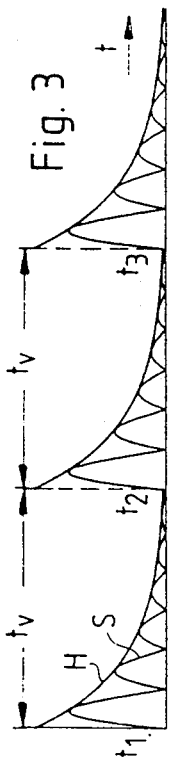
FIG. 3 is a similar diagram of partially modified envelope curves.

Another input of the mixer 14 similtaneously receives square pulses from the output of the pulse generator 8 via conductor means 16. An internal multiplying circuit of the mixer 14 rectifies the amplified signals from 13 with square pulses from the pulse generator 8, and this results in conversion of envelope curves H shown in FIG. 2 into envelope curves H' of the type shown in FIG. 3, i.e., the half of each curve H beneath the abscissa of the diagram of FIG. 2 is transferred above the abscissa.

Figure 4:
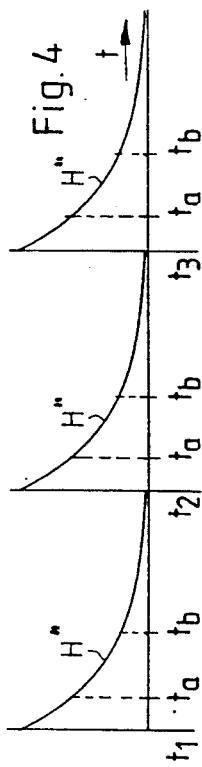
FIG. 4 is a similar diagram of additionally modified envelope curves.

The output of the mixer 14 is connected with the input of a low-pass filter 17 which permits the d-c part to pass but filters out the a-c part (overshoot) of each signal from the mixer 14. This results in the generation of signals denoting envelope curves H″ of the type shown in FIG. 4 which are indicative of oscillations of the self-oscillating oscillator 3. The output of the low-pass filter 17 transmits signals (indicative of envelope curves H″) to the corresponding input of a so-called track/sample-hold amplifier 18 having two additional inputs connected with the outputs of a control circuit 19. The purpose of the control circuit 19 is to ensure that the output of the track/sample-hold amplifier 18 transmits signals at predetermined times or stages $t_a$ and $t_b$ during each interval $t_v$. In other words, the output of the amplifier 18 transmits signals denoting two predetermined values of each envelope curve H″ within the respective interval $t_v$, and such signals are transmitted to the input of a dividing or quotient forming circuit 15 which generates signals corresponding to the quotients of signals denoting the value of an envelope curve H″ at the stages or instants $t_a$ and $t_b$.

The timing of scanning of the signals denoting the envelope curves H″ is determined by the control circuit 19 in response to signals from two counters 22 and 23. The first inputs of the counters 22, 23 are connected with the output of the pulse generator 8 via conductors 24, 26, respectively, and a further conductor 21 connects the second inputs of the counters 22, 23 with the output of the synchronizing circuit 2. The purpose of signals which are transmitted via conductor 21 is to reset the counters 22, 23 to zero and to restart or activate these counters in response to transmission of excitation pulses from the synchronizing circuit 2 to the oscillator 3. This enables the counters 22 and 23 to count the number of signals (square pulses) which are transmitted by the pulse generator 8 and to transmit to the control circuit 19 signals when the count reaches a predetermined value (namely when the signals from 17 to 18 are indicative of the values of envelope curves H″ at the stages or times $t_a$ and $t_b$ within the respective intervals $t_v$). Since the electric excitation pulses from the pulse generator 1 are synchronized with the output signals of the pulse generator 8 in the synchronizing circuit 2, determination of predetermined numbers of square pulses in the counters 22 and 23 corresponds exactly to the predetermined stages or times $t_a$ and $t_b$ during each interval $t_v$, i.e., to predetermined periods of time which elapse from the start of an interval $t_v$ to the selected time $t_a$, $t_b$, respectively.

The amplifier 18 can be of the type known as HT C-0300 which is distributed by Analog Devices, Norwood, Mass. 02062. The analog signal at the output of the quotient forming circuit 15 is transmitted to the input of an analog-digital converter 27 which transmits digital signals to the corresponding input of a computer 28. Another input of this computer receives signals from the counter 11. The computer 28 processes the signals (one of which denotes the damping of oscillator 3 and the other of which is indicative of resonance frequency of the oscillator) into signals denoting the moisture content of the material which influences the capacitor 4 and/or the coil 6.

The method and apparatus of the present invention are not limited to those applications when the resonance frequency of an oscillator must be ascertained jointly with ascertainment of damping of the oscillator, i.e., such method and apparatus can be utilized for highly accurate determination of damping or for highly accurate determination of resonance frequency alone. Moreover, the oscillator which is to be evaluated can embody a capacitor and/or a coil or the like, the capacitance and/or inductance of which varies as a function of monitoring of a variable parameter of a stream of tobacco particles, coffee beans or fragments of coffee beans and/or other commodities. The oscillator can further embody a measuring impedance, e.g., a high-frequency operated electromagnet. If the oscillator comprises two different types of measuring impedances, signals denoting the damping and/or the resonance frequency of the oscillator are generated accordingly.

An important advantage of the improved method and apparatus is that the damping and, if necessary, the resonance frequency can be ascertained rapidly, continuously and with a high degree of accuracy. In addition, the apparatus is relatively simple and versatile.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of ascertaining a characteristic value of a self-oscillating harmonic high-frequency oscillator which oscillates during intervals between periodically occurring short-lasting excitations and contains an impedance, comprising the steps of exciting the oscillator including periodically applying first electrical pulses thereto; generating second pulses having a frequency corresponding to the frequency of oscillations during said intervals; rectifying the oscillations during each interval with the corresponding second pulses; generating first signals denoting the envelope curves of oscillations during intervals of oscillations between successive excitations of the oscillator; sampling each first signal and generating second signals corresponding to the values of each sampled first signal during predetermined times of the respective interval; and generating third signals denoting damping and constituting quotients of second signals for each first signal.

2. The method of claim 1, wherein said rectifying step includes transmitting the oscillations and the second pulses to a double-balanced mixer.

3. The method of claim 2, wherein said step of generating first signals includes generating signals which denote the envelope curves of rectified oscillations at the output of the mixer during said intervals.

4. The method of claim 1, wherein said sampling step is carried out by a sample-hold amplifier when the second pulses reach predetermined numbers of pulses during the respective intervals.

5. A method of ascertaining a characteristic value of a self-oscillating harmonic high-frequency oscillator which oscillates during intervals between periodically occurring short-lasting excitations and contains an impedance, comprising the steps of exciting the oscillator including periodically applying first electrical pulses thereto; generating first signals denoting the envelope curves of oscillations during intervals of oscillation between successive excitations of the oscillator; sampling each first signal and generating second signals corresponding to the values of each sampled first signal during predetermined times of the respective interval; generating third signals denoting damping and constituting quotients of second signals for each first signal; generating second pulses having a frequency corresponding to that of said oscillations; and synchronizing said first electrical pulses with said second pulses.

6. The method of claim 5, further comprising the step of rectifying said oscillations, said step of generating first signals including generating signals denoting the envelope curves of rectified oscillations.

7. Apparatus for ascertaining a characteristic value of a self-oscillating high-frequency oscillator which oscillates during intervals between periodically occurring excitations and contains an impedance, comprising means for periodically applying relatively short excitation pulses to the oscillator; first signal generating means operative to generate first signals denoting the envelope curves of oscillations during intervals of oscillation between successive excitations of the oscillator, including means for rectifying the oscillations of the oscillator and a low-pass filter for rectified oscillations; second signal generating means including sampling means operable to sample each first signal and to generate second signals corresponding to the values of each sampled first signal during predetermined times of the respective interval; and means for generating third signals denoting the damping, including means for forming quotients of second signals for each first signal.

8. The apparatus of claim 7, wherein said rectifying means comprises a double-balanced mixer having a first input connected with the oscillator and a second input, and further comprising comparator means connected with the oscillator and including means for transmitting to said second input square pulses having a frequency corresponding to that of oscillations during said intervals.

9. Apparatus for ascertaining a characteristic value of a self-oscillating high-frequency oscillator which oscillates during intervals between periodically occurring excitations and contains an impedance, comprising means for periodically applying relatively short first excitation pulses to the oscillator; first signal generating means operative to generate first signals denoting the envelope curves of oscillations during intervals of oscillation between successive excitations of the oscillator; second signal generating means including sampling means operable to sample each first signal and to generate second signals corresponding to the values of each sampled first signal during predetermined times of the respective interval; means for generating third signals denoting damping, including means for forming quotients of second signals for each first signal; and pulse generating means connected with the oscillator for generating second pulses having a frequency corresponding to that of oscillations during said intervals.

10. Apparatus for ascertaining a characteristic value of a self-oscillating high-frequency oscillator which oscillates during intervals between periodically occurring excitations and contains an impedance, comprising means for periodically applying relatively short first excitation pulses to the oscillator; first signal generating means operative to generate first signals denoting the envelope curves of oscillations during intervals of oscillation between successive excitations of the oscillator; second signal generating means including sampling means operable to sample each first signal and to generate second signals corresponding to the values of each sampled first signal during predetermined times of the respective interval; means for generating third signals denoting damping, including means for forming quotients of second signals for each first signal; and pulse generator means connected with the oscillator for generating second pulses having a frequency corresponding to that of the oscillations during said intervals and for operating said sampling means when the sums of said second pulses during said intervals reach predetermined numbers of pulses.

11. Apparatus for ascertaining a characteristic value of a self-oscillating high-frequency oscillator which oscillates during intervals between periodically occurring excitations and contains an impedance, comprising means for periodically applying relatively short first excitation pulses to the oscillator; first signal generating means operative to generate first signals denoting the envelope curves of oscillations during intervals of oscillation between successive excitations of the oscillator; second signal generating means including sampling means operable to sample each first signal and to generate second signals corresponding to the values of each sampled first signal during predetermined times of the respective interval; means for generating third signals denoting damping, including means for forming quotients of second signals for each first signal; means for generating second pulses having a frequency corresponding to that of oscillations during said intervals; and means for synchronizing said first excitation pulses with said second pulses.

* * * * *